March 19, 1940.  C. L. SCOTT  2,194,155
COMBINED COOKING AND WATER-HEATING APPARATUS FOR DOMESTIC PURPOSES
Filed Aug. 3, 1938   6 Sheets-Sheet 1

March 19, 1940.　　　　C. L. SCOTT　　　　2,194,155
COMBINED COOKING AND WATER-HEATING APPARATUS FOR DOMESTIC PURPOSES
Filed Aug. 3, 1938　　　6 Sheets-Sheet 5

Inventor:
Charles Ludovic Scott,
By Potter, Pierce & Scheffler,
Attnys

Patented Mar. 19, 1940

2,194,155

UNITED STATES PATENT OFFICE 2,194,155

COMBINED COOKING AND WATER-HEATING APPARATUS FOR DOMESTIC PURPOSES

Charles Ludovic Scott, London, England, assignor to Allied Ironfounders Limited, London, England, a British company Application August 3, 1938, Serial No. 222,934
In Great Britain August 10, 1937

13 Claims. (Cl. 126—34)

This invention relates to improvements in combined cooking and water heating apparatus for domestic purposes, and is especially directed towards the kind of apparatus adapted for continuous burning of solid fuel, and employing a single grate and ashpit for both cooking and water heating.

Apparatus of this kind is always subject to difficulties in design, due to the double function of the fire, since, if it is desired to heat the cooker unit independently of the water heater or boiler unit, or vice versa, satisfactory segregation of the output of heat to one unit cannot be obtained without a tendency to interfere with the temperature of the other unit. It is obvious that, if a single fire is heating both the cooker and the boiler, any attempt to control the output of the fire by acting solely on the primary air supply is bound to affect both units, irrespective of whether or not it is desired to stimulate one or the other of them alone. This fact has led to the criticism that such apparatus is necessarily wasteful of fuel and uneconomical in operation.

A primary object of the present invention, is to provide a combined cooker and boiler employing a common fire with an ashpit beneath it to which primary air has access, adapted to burn solid fuel in one or both of the two zones of combustion, one of which serves the cooker unit and is controlled by a cooker damper, acting on hot gases as they pass through a cooker flue, and adapted at its minimum setting to maintain the rate of burning in the cooker fire zone above the extinction point, whilst the other serves the boiler unit and is controlled by a boiler damper acting on the hot gases as they pass through a boiler flue, whereby, when the boiler damper is closed, only the cooking fire zone will be effective and when the boiler damper is opened any dead fuel in the boiler fire zone will automatically be ignited from live fuel in the cooker fire zone, but the cooker temperature will not thereby be reduced below the minimum limit, due to the setting of the cooker damper.

The operation of the cooker or boiler damper may conveniently be automatic, for example, by means of a thermostat sensitive to one or more of the heat-consumption points of the cooker or boiler unit. The term "heat-consumption point" denotes any part of the stove in which the heat output is employed for cooking, heating or water-heating, such as the hot plate, the boiler and the oven.

Preferably, fuel for the cooker fire zone is supplied to the grate from a cooker hopper, whilst fuel for the boiler fire zone is supplied from a boiler hopper formed by a space partially or wholly surrounded by the water jacket, access to these two sources of fuel supply being independent.

A further object of the invention is to provide a combined cooker and boiler employing a common grate with an ashpit beneath to which primary air has access, through a calibrated orifice, means for controlling the flow of primary air through said orifice to produce a constant vacuum in said ashpit, a fire on said grate adapted to burn solid fuel in one or both of two zones of combustion, one of which is fed from the cooker hopper and serves the cooker and acts directly upon a member in contact with radiant fuel and located at the side of and partly below an oven, which is thereby heated by conduction; the hot gases from the cooker fire zone being arranged to pass beneath one or more hot plates and transfer substantially all their heat thereto by convection, combustion of the cooker fire zone being controlled by a thermostat sensitive to cooker temperature, operating a cooker damper, and set to maintain this temperature within maximum and minimum limits, whilst the other zone of combustion serves the boiler and is controlled by a manually operated damper acting on the boiler gases as they pass to the flue and adapted to be fully closed when the boiler is not in use, being located adjacent the top of the fuel space of the boiler, which is independent of the cooker hopper whereby the boiler fire zone will automatically ignite from the cooker fire zone if the boiler damper is open, and operate without adversely affecting the cooker temperature.

It will be appreciated in connection with the immediately preceding statement that supplying heat to both a heat consumption point of the cooker unit and a heat consumption point of the boiler unit directly by conduction, i. e., by arranging such heat consumption points in direct contact with different portions of the burning fuel bed, permits an adequate heating of both units in a compact layout suitable for domestic use and at the same time renders the two units capable of independent action which is not possible if only one unit is heated by conduction or if both are heated by conduction from the same zone of the fuel bed.

In apparatus of this kind, the more heavily heat insulated the apparatus is, the greater is the need for accurate and precise control of the rate of combustion, since poorly insulated apparatus has a more rapid heat leak, and therefore calls for a relatively higher rate of burning and correspondingly coarser control to keep the fire alight. In most normal constructions of cooker, control of the rate of burning is effected by regulating the primary air supply, either manually or automatically before it reaches the fire. Where accurate and precise control is required, this method is expensive since it entails substantially leak-proof construction of the ashpit door and the components of the ashpit itself.

For this reason, in the present construction it is preferred to employ a predetermined size of primary air opening and to regulate the rate of burning by means of a damper beyond the fire acting on the gases as they pass to the flue.

Now the major objection to the use of dampers in the flue for controlling combustion, is that positive pressure is usually set up in the fuel magazine or hopper, or in the combustion space immediately above the fire, under conditions when the damper is fully or almost closed. This is because no control is exerted on the primary air as it enters the stove, but it is merely admitted through a calibrated orifice of predetermined dimensions.

Such a building up of pressure in the hopper may lead to objectional escape of fumes in the room, unless the hopper filling orifice is rendered gas-tight, which is an expensive construction and impracticable on mass-produced stoves for reason of commercial economy.

In order, therefore, to avoid building up of pressure in a stove according to the present invention, it is a further object of the invention to have some form of automatic control over the primary air as it enters the stove, not with a view to controlling the heat output of the stove, but merely to prevent the objectionable pressure in the hopper above referred to.

Automatically adjustable means for admitting primary air are therefore preferably provided and may take one or two forms. One form comprises a by-pass between the ashpit and the flue comprising a duct leading from the underside of the fire to a point in the chimney beyond the control damper. The other form comprises a draught stabilizer or depression balance associated with the air inlet to the ashpit and adapted automatically to regulate the entry of air to the ashpit in sympathy with the degree of opening of the damper in the flue. Such stabilizers are of well known construction and comprise a delicately balanced flap. They have not hitherto been used in this position on apparatus of this kind, although they have been employed to control the depression in the flue on certain heat accumulative stoves. Thus, automatic control of the primary air, either by by-pass or stabilizer, ensures a partial vacuum in the ashpit and avoids any question of pressure building up in the hopper when the damper is closed.

It should be understood that apparatus according to the present invention is by no means inoperative, if it is unprovided with a flue by-pass or stabilizer, but that they are preferable constructions to avoid any liability to unpleasant fumes when cooking.

In my co-pending application Serial No. 197,453, I have described and claimed apparatus for heating partly by convection and partly by conduction, and it is to be understood that I make herein no claim for such apparatus per se, but only when used in a combined cooker and boiler as above described.

Several embodiments of the invention will now be described with reference to the accompanying drawings, whereof.

Throughout the specification and drawings, like parts will be illustrated and referred to by like reference numerals.

Referring to the drawings, the fire is located on the grate 1, beneath which is the ashpit 5, fuel for the cooker fire zone $2^d$ being inserted into the hopper 2, whilst fuel for the boiler fire zone $3^a$ is inserted into a space 3, which is surrounded on three sides by the water jacket 6 of the boiler.

The cooker hopper 2 is bounded at the front by a fire brick wall $2^c$, on the side nearest the edge of the cooker by a further wall with a firebrick deflector $2^b$ at the bottom, and on the side inwardly towards the cooker, away from the boiler 6, by a further wall $2^a$ also made wholly or partly of firebrick, especially its lower portion or nose.

At the side of the cooker hopper 2 and the fire are located two ovens 8 and 9, one above the other, the oven 8 being the main oven, whilst the oven 9 is the subsidiary oven.

The ovens 8 and 9 are heated almost entirely by direct metallic conduction, since when fuel is inserted into the cooker hopper 2 it falls down on top of the grate 1 filling the cooker fire zone $2^d$. When this fuel is ignited, the radiant fuel in the cooker fire zone $2^d$ is in direct contact with the plate 10 and in substantially direct contact with the member 11 which forms part of the side wall and base of the oven 8. The oven 8 is heated by conduction from the members 10 and 11, whilst the oven 9 is heated partly by radiation from the member 11 above it, and also partly by conduction through the metal members 12, which connect the two ovens together.

The combustion gases from the fire burning in the cooker fire zone $2^d$ pass upwardly into the passage 7 between the wall $2^a$ and the oven 8, and then strike the underside of the top plate 14 of the apparatus, thence moving laterally above the top of the oven 8 in the passage $7^a$, and being diverted across from front to back of the stove in the passage $7^b$, finally passing out through the flue passage 13.

The upper and lower walls of the passage $7^a$, $7^b$ are of metal and may have a certain heat storage capacity, depending upon their thickness. In order to prevent the flue gases in the passage 7, $7^a$, $7^b$ from imparting their heat to the top of the oven 8, an insulating sheet 15 of asbestos, millboard or the like, is employed above the top of the oven, beneath the wall $14^a$ of the passage $7^a$ for flue gases.

One or more hot plates or rings 16 are provided on top of the passage $7^a$, preferably being detachable for rapidity of boiling where desired, and also for cleaning the flue 7ª, 7ᵇ.

Primary air for the fire has free access to the underside of the grate 1 via the orifice 35, which opens into the ashpit 5, the combustion in the cooking fire zone 2ᵈ being controlled by a cooker damper 17 located in the passage of the combustion gases, at the bottom of the flue 13, and controlled by means of a thermostat 18 sensitive to the temperature of the flue gases and the surrounding parts of the flue channel 7ª or 7ᵇ.

The thermostat 18 is set so that the cooker cannot fall below or exceed predetermined minimum and maximum temperatures irrespective of any action of the boiler.

So far only the operation of the cooking fire zone and the cooker have been described, that part of the apparatus employed for water heating being supposed to be not in use. Let us now assume it is desired to light a fire in the boiler fire zone 3ª.

Figure 1:
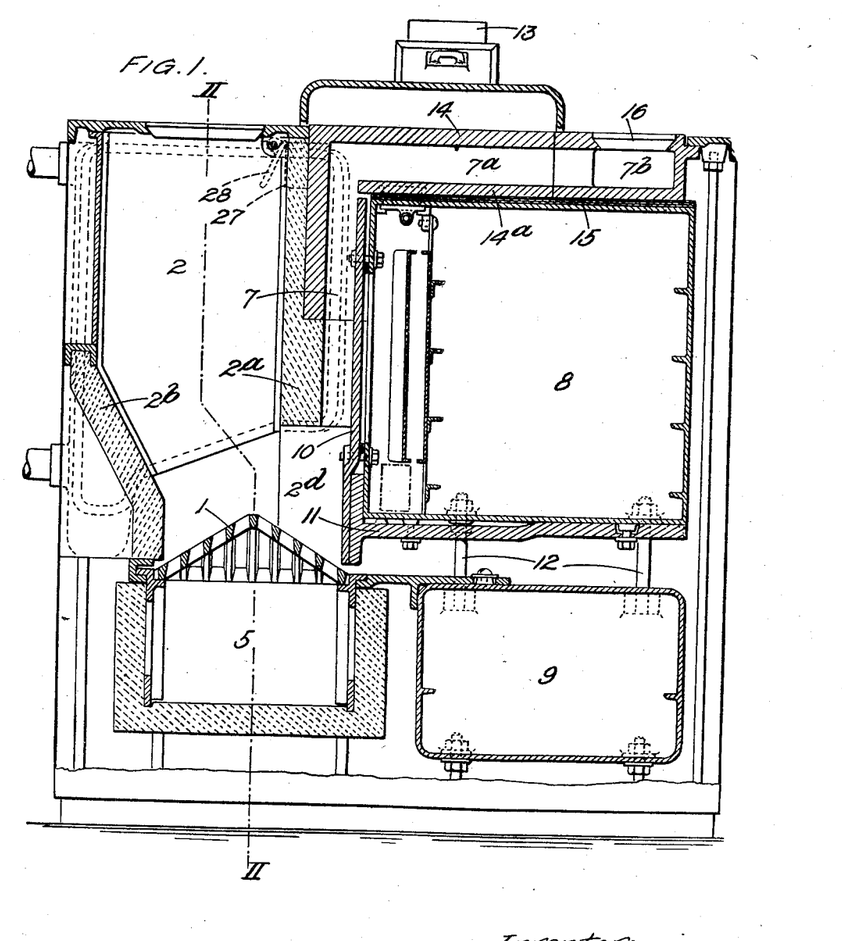
Fig. 1 is a longitudinal section through a combined cooker and boiler, on the line I—I of Fig. 2.
Figure 2:
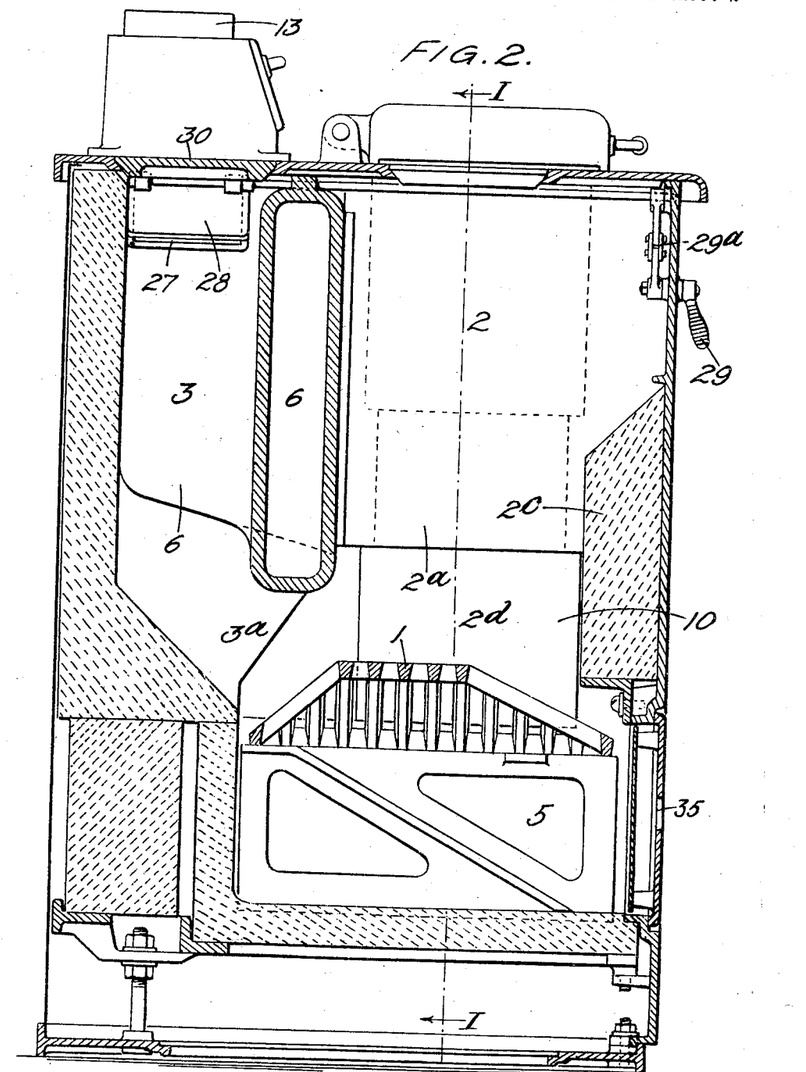
Fig. 2 is a cross section through the fire grate at right angles to Fig. 1 on the line II—II of Fig. 1.
Figure 3:
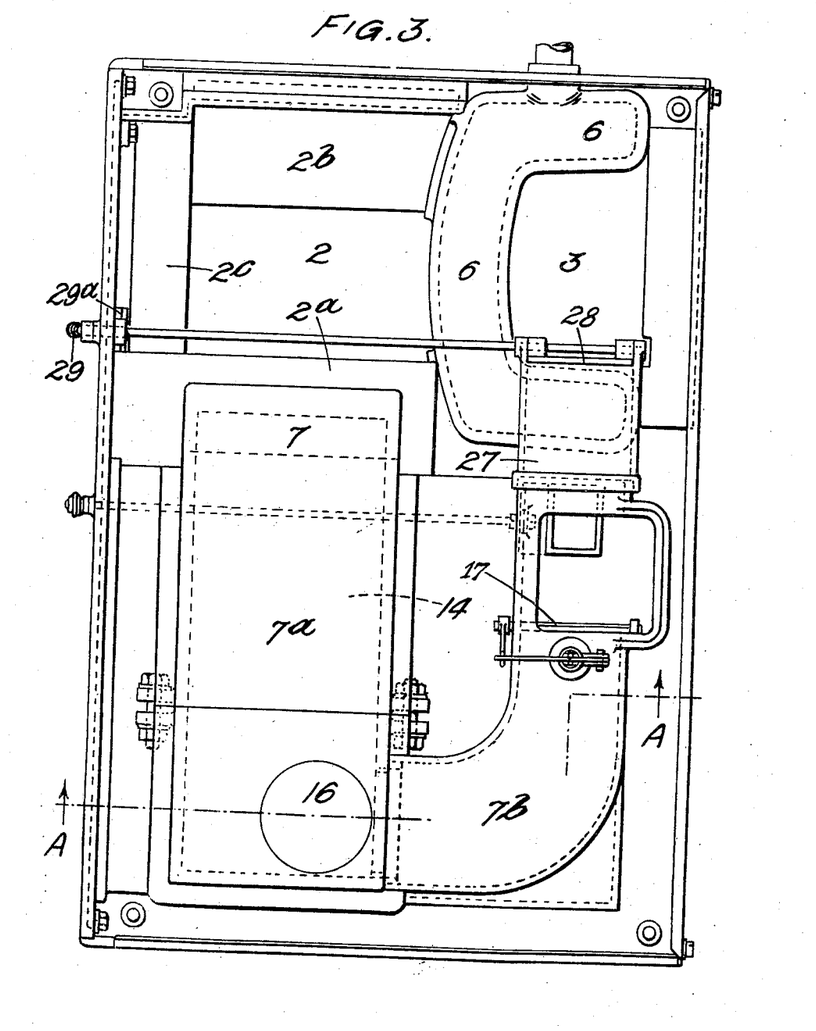
Fig. 3 is a plan view with top cover removed.
Figure 4:
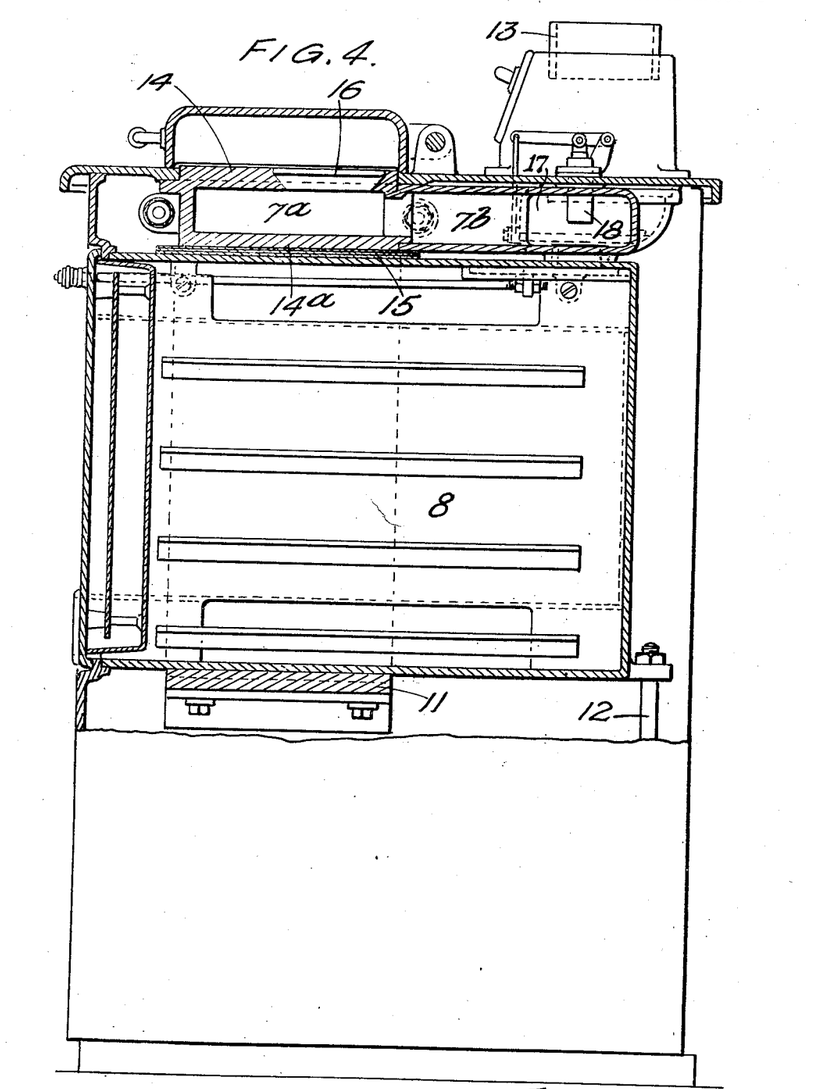
Fig. 4 is a transverse section on the line A—A of Fig. 3.
Figure 5:
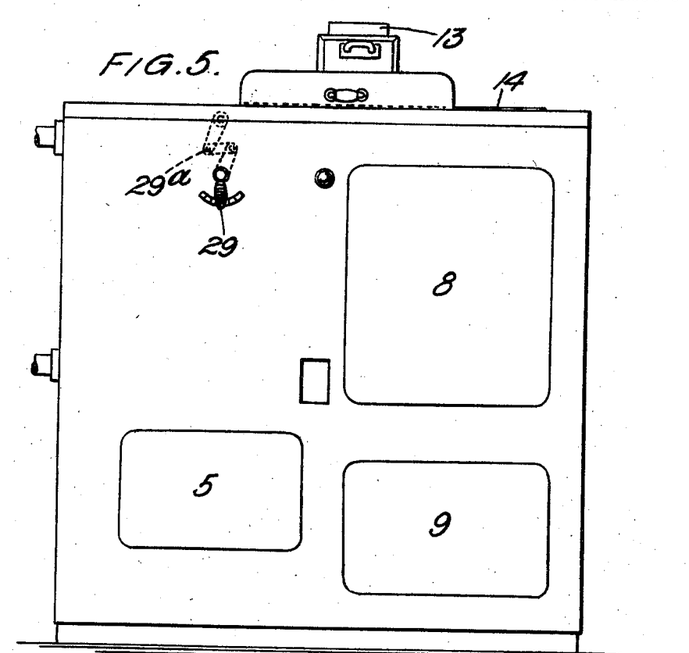
Fig. 5 is a diagrammatic front elevation.
Figure 6:
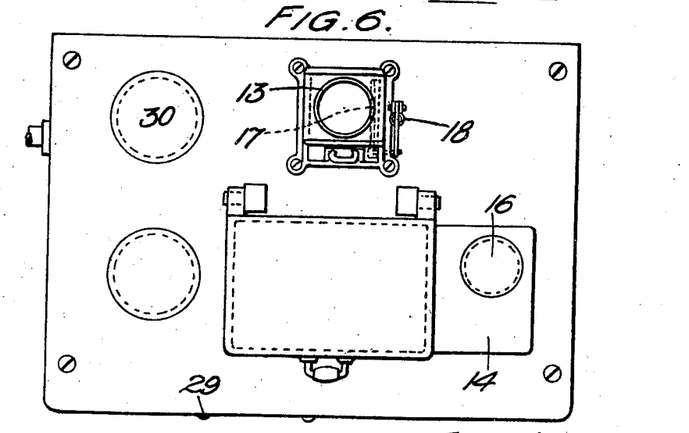
Fig. 6 is a diagrammatic plan of Fig. 5.

Fuel will be inserted into the space 3, and will fall into the fire zone 3ª, being ignited from the glowing fire of the cooking fire zone 2ᵈ. The ignition of the fuel in the compartment 3ª depends upon whether there is a flow of air upwards through the boiler fire zone 3ª, through the space 3 and outwardly through the boiler flue 27 into the main flue 13. This flow of air is controlled by a boiler damper 28 with a manual control 29, working a lever and link mechanism 29ª (Fig. 5), the boiler damper 28 being capable of full closure to prevent any combustion taking place in the boiler fire zone 3ª if it is not desired to heat the water.

A supplementary boiling ring 30 may be provided at the top of the fuel space 3 within the boiler, and may be employed when the boiler is in use. It is a feature of this construction that refuse may be burnt without affecting the functioning of the apparatus.

It is a feature of this construction that there is no inter-action between the two zones of combustion. Even if no fuel is in the fuel space and the boiler damper is left open, the cooker temperature will not be materially reduced, although there will be a slight by-passing effect from the cooker fire zone and some of the hot gases therefrom will pass upwardly to the boiler fire zone.

The thermostatic control of the cooker fire zone will, however, always maintain the necessary minimum cooker temperature and the only apparent result of leaving the boiler damper open and not inserting boiler fuel will be a rather extravagant use of fuel in the cooker hopper and, of course, a much reduced heating effect in the boiler since the latter has not been stoked.

It has been found that when either or both the cooker damper 17 and the boiler damper 28 are partially or almost fully closed, entry of air through the primary air orifice 35 will cause pressure to build up in the cooker hopper 2 and/or the boiler hopper 3. This will lead to an objectionable escape of fumes from the hoppers.

In order to overcome such a tendency for pressure to build up in the hoppers when the dampers are closed, it is preferable to provide means for automatically controlling the admission of primary air through the orifice 35, in such a way that there is always a partial vacuum or depression in the ashpit 5.

Figures 7, 8:
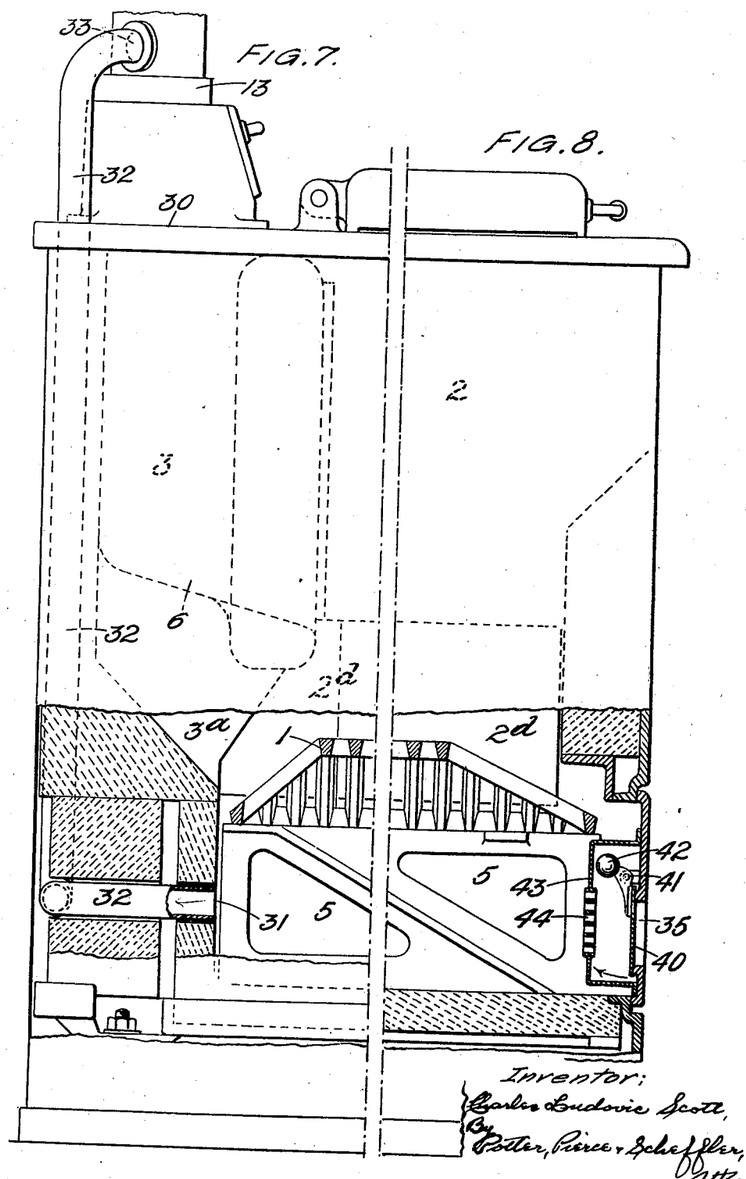
Fig. 7 shows a section through one specific construction of the invention illustrating one way of reducing pressure in the fuel hoppers.
Fig. 8 shows a section through another specific construction illustrating another way of reducing pressure in the fuel hoppers.

In the specific construction illustrated in Fig. 7, this is overcome by providing a by-pass duct 32 leading from one wall of the ashpit through the orifice 31 and passing into the chimney 13 at the point 33 beyond the controlling dampers.

The passage of the hot air up the chimney 13 will ensure a slight suction in the by-pass 32 which will lead to a corresponding suction or depression in the ashpit 5, thus overcoming any tendency for pressure to build up in the hoppers.

An alternative solution is illustrated by the specific construction shown in Fig. 8. In this case, no by-pass is provided, but the primary air orifice 35 is controlled by a draught stabilizer comprising a flap 40 pivoted at 41 and counterbalanced by a bob weight 42. The arrangement is well known and any similar device may be employed for the same purpose. Preferably such a draught stabilizer is enclosed by a cover plate 43 apertured for the passage of air at 44.

This application is a continuation-in-part of my application Serial No. 197,452 filed March 22, 1938.

I claim:

1. A combined cooking and water-heating stove of the kind adapted to burn solid fuel, having in combination a single fire grate, an ashpit beneath said fire grate, automatically adjustable means for admitting primary air to the underside of said fire grate, a cooker hopper feeding fuel for cooking to one part of said fire grate, a cooker combustion chamber located at the base of said cooker hopper and partly defined by the walls thereof, a cooker fire zone in said combustion chamber, an outlet passage for gases from said cooker fire zone, heat consumption points forming part of the walls of said passage, a cooker damper in said passage controlling combustion in said cooker fire zone, a thermostat sensitive to the temperature of at least one of said heat consumption points and operatively associated with said cooker damper to open and close same, a boiler hopper feeding fuel for water-heating purposes on to the other part of said fire grate, a boiler combustion chamber located at the base of said boiler hopper and partly defined by the walls thereof, a boiler fire zone in said combustion chamber, a second outlet passage for gases from said boiler fire zone, and a manually operated boiler damper in said second outlet passage controlling combustion in said boiler fire zone, said boiler damper being adapted to be fully closed when the boiler is not in use, thereby preventing combustion in said boiler fire zone.

2. A combined cooking and water-heating stove of the kind which burns solid fuel, including a single fire grate triangular in cross-section and trapezoidal in longitudinal section, an ashpit beneath said fire grate, an orifice in one wall of said ashpit for admitting primary air beneath said fire grate, a pair of interconnected adjacent combustion chambers on the longitudinal axis of said fire grate, a cooker hopper feeding fuel to one combustion chamber to form a cooker fire zone, a boiler hopper feeding fuel to the other combustion chamber to form a boiler fire zone, and a water jacket forming the boiler defining at least three sides of said boiler hopper and depending into said boiler fire zone, one water-jacketed wall of said boiler being disposed transversely of said fire grate and serving to separate said cooker hopper from said boiler hopper.

3. A combined cooking and water-heating stove of the kind which burns solid fuel, having a single fire grate, a pair of interconnected adjacent combustion chambers above said fire grate, a cooker hopper feeding fuel to one combustion chamber to form a cooker fire zone, a boiler hopper feeding fuel to the other combustion chamber to form a boiler fire zone, a water jacket defining at least three sides of said boiler hopper and depending into said boiler fire zone, one wall of said boiler hopper being disposed transversely of said fire grate, and serving to separate said boiler hopper from said cooker hopper, a passage beneath said separating wall linking the two zones of combustion, an outlet for combustion gases from said cooker fire zone, a thermostatically operated damper controlling said outlet, a second outlet for gases from said boiler fire zone, and a manually operated damper controlling said second outlet and adapted to be fully closed when the boiler is not being used, whereby, when said boiler damper is closed, only the cooking fire zone will be effective, and when said boiler damper is opened ignition of said boiler fire zone will automatically take place from said cooker fire zone by virtue of said linking passage, but cooker temperature will not be materially reduced due to the action of said thermostatically operated cooker damper.

4. A combined cooker and boiler having a common fire grate, two zones of combustion on said fire grate, one of which serves the cooker whilst the other serves the boiler, a cooker damper acting on the gases from said cooker fire zone, a thermostat operating said damper and sensitive to cooker temperature and set to maintain this temperature within maximum and minimum limits, and a manually operated boiler damper acting on the gases from the boiler fire zone, whereby, when the boiler damper is closed, only the cooking fire zone will be effective and when the boiler damper is opened the boiler fire zone will automatically be ignited from the cooker fire zone, but the cooker temperature will not be reduced below the minimum limit due to the action of the said thermostatically operated cooker damper.

5. A combined cooker and boiler as claimed in claim 4, including a cooker hopper for supplying fuel to the cooker fire zone and a boiler hopper for supplying fuel to the boiler fire zone, the said boiler hopper having at least two sides water-jacketed, and the two hoppers having independent means of access.

6. A combined cooker and boiler adapted to burn solid fuel, having a common fire grate, two zones of combustion on said fire grate, one of which serves the cooker whilst the other serves the boiler, a cooker hopper feeding fuel to the cooker fire zone, a water-jacketed boiler hopper feeding fuel to the boiler fire zone, a cooking oven located at one side of the cooker fire zone, a high duty metal member in contact with radiant fuel in the cooking fire zone and in heat conductive association with said oven, an outlet passage for combustion gases from the cooker fire zone, hot plates in the walls of said outlet passage deriving heat from said gases by convection, a cooker damper in said passage controlling combustion in the cooker fire zone, a thermostat in heat-exchange relationship with at least one of said hot plates and operatively associated with said cooker damper, said thermostat being set to maintain cooker temperature within maximum and minimum limits, an outlet passage for combustion gases from the boiler fire zone, and a manually operated boiler damper controlling said boiler gases and adapted to be fully closed when the boiler is not in use, said damper being located adjacent the top of the boiler hopper, whereby opening of the boiler damper results in the automatic ignition of the boiler fire zone from the cooker fire zone without adverse effects on the cooker temperature.

7. A combined cooking and water-heating stove of the kind adapted to burn solid fuel, having in combination a single fire grate, an ashpit beneath said fire grate, a cooker hopper feeding fuel for cooking on to one part of said fire grate, a cooker combustion chamber located at the base of said cooker hopper and partly defined by the walls thereof, a cooker fire zone in said combustion chamber, an outlet passage for gases from said cooker fire zone, heat consumption points forming part of the walls of said passage, a cooker damper in said passage controlling combustion in said cooker fire zone, a thermostat sensitive to the temperature of at least one of said heat consumption points and operatively associated with said cooker damper to open and close same, a boiler hopper feeding fuel for water-heating purposes on to the other part of said fire grate, a boiler combustion chamber located at the base of said boiler hopper and partly defined by the walls thereof, a boiler fire zone in said combustion chamber, a second outlet passage for gases from said boiler fire zone, a manually operated boiler damper in said second outlet passage, controlling combustion in said boiler fire zone and adapted to be fully closed when the boiler is not in use, thereby preventing combustion in said boiler fire zone, a common flue connected both with said first and said second outlet passages and automatically adjustable means for admitting primary air to said ashpit in quantities insufficient to cause pressure in said hoppers when said dampers are fully or partly closed.

8. A combined cooking and water-heating stove of the kind adapted to burn solid fuel, having in combination a single fire grate, an ashpit beneath said fire grate, a cooker hopper feeding fuel for cooking on to one part of said fire grate, a cooker combustion chamber located at the base of said cooker hopper and partly defined by the walls thereof, a cooker fire zone in said combustion chamber, an outlet passage for gases from said cooker fire zone, heat consumption points forming part of the walls of said passage, a cooker damper in said passage, controlling combustion in said cooker fire zone, a thermostat sensitive to the temperature of at least one of said heat consumption points and operatively associated with said cooker damper to open and close same, a boiler hopper feeding fuel, for water-heating purposes, on to the other part of said fire grate, a boiler combustion chamber located at the base of said boiler hopper and partly defined by the walls thereof, a boiler fire zone in said combustion chamber, a second outlet passage for gases from said boiler fire zone, a manually operated boiler damper in said second outlet passage, controlling combustion in said boiler fire zone and adapted to be fully closed when the boiler is not in use, thereby preventing combustion in said boiler fire zone, a common flue connected with both said first and said second outlet passage, and a by-pass duct connecting said ashpit to said flue, whereby suction in said flue causes a vacuum in said ashpit, thereby automatically controlling admission of primary air to said fire zones and preventing pressure building up in said hoppers when said dampers are fully or partly closed.

9. A combined cooking and water-heating stove of the kind adapted to burn solid fuel, having in combination a single fire grate, an ashpit beneath said fire grate, a cooker hopper feeding fuel for cooking on to one part of said fire grate, a cooker combustion chamber located at the base of said cooker hopper and partly defined by the walls thereof, a cooker fire zone in said combustion chamber, an outlet passage for gases from said cooker fire zone, heat consumption points forming part of the walls of said passage, a cooker damper in said passage, controlling combustion in said cooker fire zone, a thermostat sensitive to the temperature of at least one of said heat consumption points and operatively associated with said cooker damper to open and close same, a boiler hopper feeding fuel for water-heating purposes on to the other part of said fire grate, a boiler combustion chamber located at the base of said boiler hopper and partly defined by walls thereof, a boiler fire zone in said combustion chamber, a second outlet passage for gases from said boiler fire zone, a manually operated boiler damper in said second outlet passage, controlling combustion in said boiler fire zone and adapted to be fully closed when the boiler is not in use, thereby preventing combustion in said boiler fire zone, a common flue connected with both said first and said second outlet passage, and a draught stabilizer associated with the air inlet to said ashpit and adapted automatically to regulate entry of air to said ashpit in sympathy with the degree of opening of said dampers, thereby ensuring a vacuum in said ashpit and automatically controlling admission of primary air to said fire zones and preventing pressure building up in said hoppers when said dampers are fully or partly closed.

10. A combined cooker and boiler adapted for continuous burning of solid fuel, having in combination a single fire grate, two independent hoppers delivering fuel on to said grate, an ashpit beneath said grate, means for admitting primary air in calibrated quantities to said ashpit, a cooker combustion chamber for one part of the fuel on said grate defined by the lower end of one hopper and forming a cooker fire zone, at least one cooking heat-consumption point in heat conductive contact with burning fuel in said cooker fire zone, an outlet passage for gases from said cooker fire zone, a cooker damper in said outlet passage controlling combustion in said cooker fire zone, at least one heat-consumption point adjacent a part of said outlet passage and deriving convected heat from gases therein, a boiler combustion chamber for the other part of the fuel on said grate defined by the lower part of the second hopper and forming a boiler fire zone, a water-jacketed part of the boiler in direct contact with burning fuel in said boiler fire zone, a second outlet passage for gases from said boiler fire zone, a boiler damper in said second outlet passage controlling combustion in said boiler fire zone and a further water-jacketed part of the boiler adapted to derive secondary convected heat from the gases in said second outlet passage.

11. A combined cooker and boiler adapted for continuous slow burning of solid fuel having in combination a single fire grate, two independent hoppers delivering fuel on to said grate, an ashpit beneath said grate, a calibrated primary air orifice in one wall of said ashpit, a cooker combustion chamber for one part of the fuel on said grate defined by the lower end of one hopper and forming a cooker fire zone, an outlet passage for gases from said cooker fire zone at the base of said hopper, a stove top-plate including a heavy mass of metal depending downwardly towards said cooker fire zone, said mass forming one wall of said outlet passage, a cooker damper in a part of said outlet passage controlling combustion in said cooker fire zone, a boiler combustion chamber for the other part of the fuel on said grate defined by the lower part of said second hopper and forming a boiler fire zone, a water-jacketed part of the boiler in direct contact with burning fuel in said boiler fire zone, a second outlet passage for gases from a point adjacent the top of said boiler hopper whereby combustion takes place upwardly in said hopper and a boiler damper in said second outlet passage controlling combustion in said boiler fire zone.

12. A combined cooker and boiler adapted for the continuous slow burning of solid fuel, having in combination a single fire grate, two independent hoppers delivering fuel on to said grate, an ashpit beneath said grate, a calibrated primary air orifice in one wall of said ashpit, automatically adjustable means for admitting primary air to said ashpit in quantities insufficient to cause pressure in said hoppers, a cooker combustion chamber for one part of the fuel on said grate defined by the lower end of one hopper and forming a cooker fire zone, an outlet passage for gases from said cooker fire zone at the base of said hopper, a stove top-plate including a heavy mass of metal depending downwardly towards the said cooker fire zone, said mass forming one wall of said outlet passage, a cooker damper in part of said outlet passage controlling combustion in said cooker fire zone, a thermostat associated with said top-plate and said outlet passage and operatively associated with said cooker damper to open and close same, an oven located at one side of said cooker fire zone, a high duty metal member forming a wall of said oven and also a wall of said outlet passage, a boiler combustion chamber for the other part of the fuel on said grate defined by the lower part of said second hopper and forming a boiler fire zone, a water-jacketed part of the boiler in direct contact with burning fuel in said boiler fire zone, a second outlet passage for gases in said boiler fire zone and a boiler damper in said second outlet passage controlling combustion in said boiler fire zone.

13. A combined cooker and boiler as claimed in claim 10 including heat-insulation for at least one of the heat-consumption points.

CHARLES LUDOVIC SCOTT.